United States Patent Office 3,153,340
Patented Oct. 20, 1964

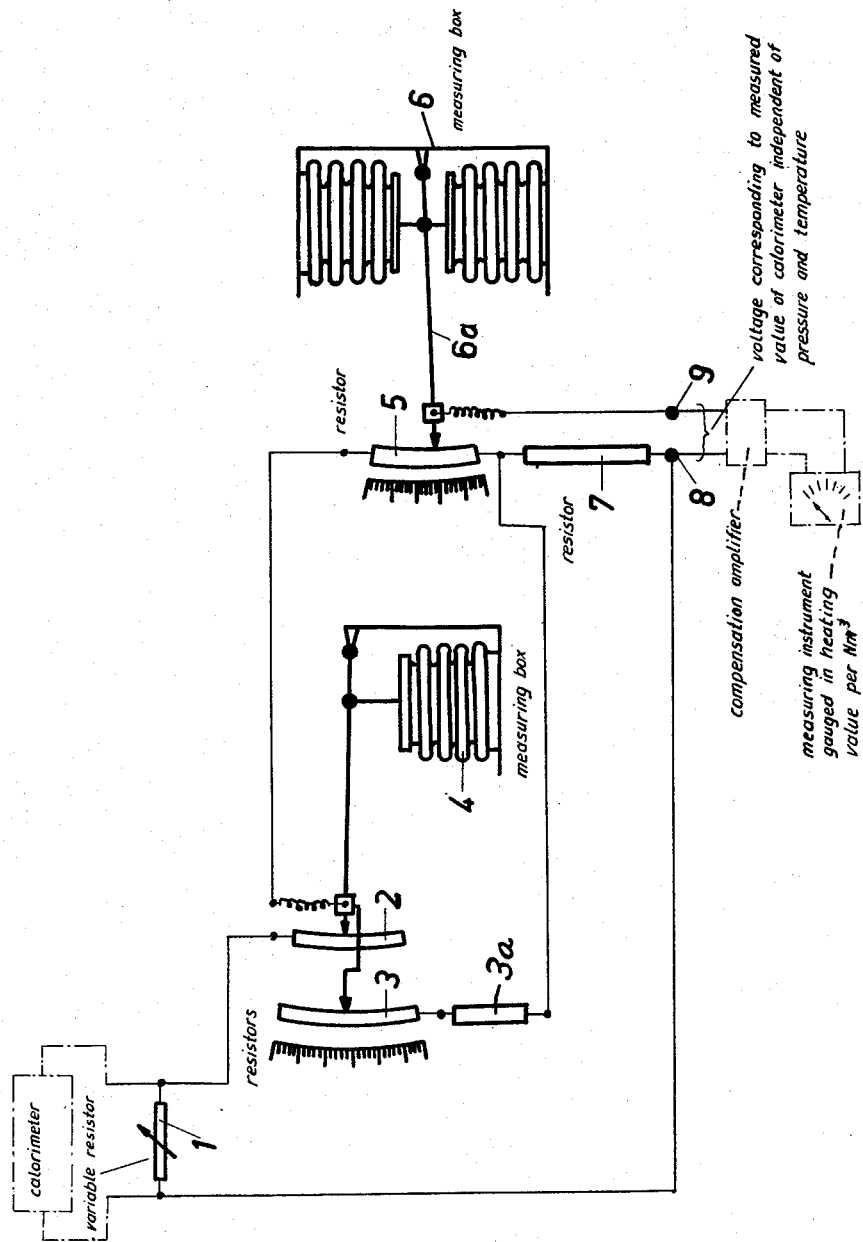

3,153,340
DEVICE FOR CONVERTING THE ELECTRIC MEASURING VALUES OBTAINED IN AUTOMATIC DRY CALORIMETERS TO A CERTAIN NORMAL CONDITION OF THE TESTED COMBUSTION GAS
Gustav Niedergesäss, Essen, Germany, assignor to Ruhrgas Aktiengesellschaft, Essen, Germany
Filed Nov. 13, 1961, Ser. No. 151,980
Claims priority, application Germany Nov. 24, 1960
5 Claims. (Cl. 73—190)

The present invention relates to a device for converting the ascertained values of automatic calorimeters, which work with air or other gaseous substances as heat carrier, to values at a certain normal condition of the gases involved. With automatic calorimeters for fuel gases which work with air or another gaseous substance as heat carrier and which are generally designated as dry calorimeters, the employment of so-called evaluators or computers is unknown as they are employed with automatic calorimeters using water as heat carrier, for converting the ascertained value to a fixed normal condition. For more precise measurements of the heating value or the combustion heat of gases, it is necessary to start from a fixed and known physical condition of the fuel gas and also of the heat carrier ahead of the calorimeter. The ascertainment of the moisture condition of both substances causes most of the difficulties, so that, advantageously, the substances should, ahead of the calorimeter, be available in completely dry or in moist, saturated condition.

Only with dry fuel gas and heat carrier is it possible, without employment of an evaluator or computer, directly to measure the heating value or combustion heat with regard to a normal condition. By "heating value," the lower heating value, and by "combustion heat," the upper heating value is meant. If, however, when measuring the respective values, the operation is started with the more easily obtainable moist saturated condition of the substances, a computer is necessary if the measurement or indication of the measured value is to be independent of changes in the room temperature or the temperature of the oncoming gases.

The heating value of a combustible gas based on a dry normal condition is, when dealing for instance with steam saturated combustible gas and with likewise saturated air as heat carrier, determined by the formula (1)     $H_{uo} = L \times \Delta t (c_{pL} + K \times G_D \times c_{pD})$ kcal./Nm.$^3$ when both substances enter the calorimeter in the same physical condition, which means that the temperature, pressure and moisture content of the two substances—combustible gas and air—are the same.

A constant difference in pressure between the combustible gas and air is irrelevant because it can be taken in consideration during the gauging. Pressure differences of the combustible gas caused by changes in the specific density in view of variations in the composition of the gas cause only minor measuring errors of for instance ±0.1% at pressure variations by about ±10 millimeters water column, which can be ignored for all practical purposes if they do not affect the volumetric ratio between combustible gas and heat carrier.

In the above Formula 1:

$H_{uo}$ indicates the heating value in kcal./Nm.$^3$ combustible gas,
L indicates the air through-flow in Nm.$^3$ per Nm.$^3$ combustible gas,
Kcal. is the measuring unit for the heat quantity; 1 kcal. (kilocarorie) = 1000 cal. (calories),
$\Delta t$ indicates the temperature difference in ° C. between air entrance and waste gas-air mixture exit,
$c_{pL}$ designates the specific heat of the dry air in kcal./Nm.$^3$ ° C.,
$c_{pD}$ stands for the specific heat of the steam in kcal./kg. ° C.,
$G_D$ is the steam weight in kg./m.$^3$ at the respective temperature and saturation,
K is a conversion factor for converting or computing the steam weight from kg./m.$^3$ moist air into kg./Nm.$^3$ dry air, which is identical to the conversion factor for converting from m.$^3$ saturated air into Nm.$^3$ dry air or gas.

In the above, Nm.$^3$ means a normal cubic meter; 1 Nm.$^3$ gas = 1 m.$^3$ dry gas at a temperature of 0° C. and at a pressure of 760 torr. Torr is a physical measuring unit for the pressure customary in connection with air pressure measurements by means of a mercury barometer.

Whereas the value $G_D$ depends on the temperature only, K is also influenced by the barometric pressure and is obtained in conformity with the following formula (at a normal condition of zero degree C., 760 torr and dry)

(2)     $K = \dfrac{273 + t}{273} \times \dfrac{760}{b' - \gamma}$ in this formula:

$t$ designates the temperature of the substances prior to their entry into the calorimeter,
$\gamma$ designates the steam pressure in millimeters mercury column at saturation at the temperature $t$,
$b'$ stands for the absolute pressure of the gas ahead of the restrictor orifice or measuring nozzle of the calorimeter and is measured in millimeters mercury column.

An apparatus for reducing the indication of a heating value measuring device to a certain normal condition is known and disclosed for instance in German Patents 459,743 and 640,894. The designation selected in said patents and reading in translation "Heating Value Measuring Device" should in conformity with present customary terminology be replaced by "Combustion Heat Measuring Device." This known device measures the value K only but does not separately take into account $G_D$. Moreover, with this known device, with a change in K, also the resistance of the entire system changes whereby an additional measuring error will be caused even though it is in most instances minor.

In contrast to the heretofore known devices, with the device according to the present invention, there is measured not only the factor K in the above mentioned formula but also $Gd$, and neither when measuring the temperature difference in the calorimeter nor in the converter representing the invention proper, is there used a foreign voltage or current source.

The present invention overcomes the above mentioned drawbacks as to measuring precision of automatic calorimeters or devices for converting the electric measuring values obtained in an automatic calorimeter to a normal condition.

The present invention concerns a device for converting the electric measuring values obtained in an automatic dry calorimeter to a certain normal condition of the tested combustion gas, said device being characterized in that in the input circuit for the electric voltage proportional to the temperature difference measured in the calorimeter there is provided a series circuit consisting of a first fixed resistor in series with a second resistor having a sliding contact thereon and serving as a potentiometer, said second resistor having arranged parallel thereto an adjustable resistor and there is furthermore provided an adjustable compensating resistor. The output of the device is the voltage measured across said first fixed resistor and that portion of the second resistor between said first resistor and the sliding contact of the second resistor.

The invention is additionally characterized in that the sliding contact or potentiometer terminal of the second resistor is adjustable in conformity with the input temperature of the heat carrier while the adjustable parallel resistor is adjustable in conformity with the absolute pressure and the temperature, and the adjusting arrangement of the parallel resistor is rigidly coupled with that of the compensating resistor for the purposes of obtaining a constant input resistance.

The resistor in parallel to the second resistor has its magnitude adjustable in conformity with the absolute pressure and temperature or humidity. While this resistor arranged in parallel to said second resistor corresponds to the above first mentioned known device (thermomanometer) for reducing the measuring values obtained in the calorimeter, it should be noted that this resistor in the present invention represents only a partial unit of the converter, whereas with the known devices, the conversion is only effected by means of the thermomanometer which may be designed in any desired manner.

It is an object of the present invention to provide an apparatus of the general type mentioned above which will overcome the lack of measuring precision of automatic calorimeters.

It is another object of this invention to provide an apparatus according to the preceding paragraph for use in connection with calorimeters with electric starting values, which will compute the values measured in connection with barometric pressure and temperature so that these values will be converted to values based on a normal condition.

These and other objects and advantages of the invention will appear more clearly from the following specification in connection with the accompanying drawing diagrammatically showing an apparatus according to the invention.

Referring in detail to the drawing, the arrangement shown therein comprises an absolutely tightly closed measuring box 4 which contains in its interior an inert gas and a few drops of a suitable liquid, as for instance water, for saturation of said gas. Such measuring box, which may be designed in the manner of a well known aneroid barometer, is a condition sensitive means which responds to changes in the barometric pressure and temperature and measures the factor K similar to the known computors and indicates the measured value on a dial. At the same time, said measuring box 4 will, through a pivoted lever or pointer, adjust a contact along a variable resistor 3 to set a resistance value on the variable resistor which is proportional to the factor K.

The arrangement shown in the drawing also comprises a further measuring box system 6 which is composed of two measuring boxes forming a condition sensitive means operating in conformity with the same aneroid barometer principle as the measuring box 4. Due to the fact that one of the measuring boxes of this device 6 contains a dry neutral gas whereas the gas in the second measuring box of this device 6 is saturated for instance with steam in a similar manner as has been mentioned in connection with the measuring box 4. The movement of the pointer of the measuring device 6 is dependent only on the temperature or steam weight per cubic meter in condition of saturation because these two values are proportional to each other. In other words, the pivoted lever or pointer 6a will indicate the steam weight per cubic meter in condition of saturation and will adjust a contact along the resistor 5 to set a resistance value proportional to the steam weight per cubic meter. For purposes of measuring the temperature, it is possible, in addition to the temperature measuring device shown in the drawing, also to employ any other temperature measuring device which is suitable for transmitting the measured value to the resistor 5. The gauging of the temperature measuring device in kilograms steam per cubic meter gas may be effected by means of the well known steam tables.

Adjacent each of resistors 3 and 5 there may be graduated dials so the respective pointer positions can easily and accurately be detected visually.

The thermovoltage produced by the thermocolumn of the calorimeter is by the variable resistor 1 adapted once and for all to the desired measuring range. By thermocolumn is meant the measuring device by means of which in a calorimeter the two temperatures or, more correctly expressed, the temperature difference between the cold heat transfer medium entering the calorimeter—in the present example air—and the medium heated by the gas combustion and leaving the calorimeter—in this instance the combustion gas air mixture—is measured. Generally, for this purpose, one thermoelement soldering point is introduced into the cold stream and one thermoelement soldering point is introduced into the hot stream, and both soldering points are connected to each other and form a thermoelement. In view of the difference in temperatures at the two soldering points of the thermoelement, an electric voltage will be produced which is designated as thermovoltage insasmuch as it is brought about by a difference in temperature. Inasmuch as the thermovoltage produced in one thermoelement is very low and is difficult to measure with customary measuring devices, it is customary to arrange a plurality of thermoelements, for instance more than twenty, in series and such arrangement is then known as thermocolumn or thermobattery.

According to the voltage measured at the terminals of the resistor 1, a measuring current will flow through resistor 2, resistors 3 and 5 arranged in parallel to each other and the resistor 7. A fixed resistor $3a$ is in series with variable resistor 3. The magnitude of this measuring current will depend solely on the temperature difference $\Delta t$ in the calorimeter because in view of the circuit arrangement the total resistance of the circuit remains always constant. At the terminals 8 and 9 of the resistors 5 and 7 there will be measured a voltage in conformity with the pressure and temperature of the gas based on a certain normal condition and the thus obtained measured value will by means of a compensation amplifier measuring in a currentless manner be converted into a proportional measuring current which flows to a measuring device which may be graduated for instance in heating value per $Nm.^3$.

It is well known that with measuring elements proper, as for instance thermocolumns or measuring nozzles, tolerances in production are unavoidable so that the same measuring operation carried out with two different measuring elements will result in different measured values.

On the other hand, it is customary to graduate or calibrate electrical measuring instruments as they are employed in conformity with the present invention in a uniform manner for a certain measuring range so that for instance for a pointer position brought about by a voltage of 22.5 millivolts, the said pointer position will always correspond to a heating value of for instance 10,000 kcal./$Nm.^3$. Thus, it would be possible to connect the same calorimeter to different measuring instruments of the same type one after another, and it would be ascertained that all of these instruments will indicate the same heating value provided, of course, that in the meantime the voltage has not changed.

In order to make it possible that in spite of the above mentioned differing manufacturing tolerances which with different calorimeters will produce different thermovoltage and/or thermovoltages at the terminals, to connect to each calorimeter the uniformly gauged measuring instruments, it is necessary that the thermocolumn of the calorimeter will in each instance produce a voltage which equals or exceeds that voltage which corresponds to said pointer position or respective dial line of the measuring instrument indicating the heating value of the gas whose testing has produced the respective voltage in the calorimeter. Thus, if in conformity with the above mentioned example in the calorimeter there is burned a gas of 10,000 kcal./Nm.³ and if on the electric measuring instrument the dial value of 10,000 kcal./Nm.³ has associated therewith or corresponds to a voltage of 22.5 millivolts, the thermocolumn of the calorimeter must produce at least 22.5 millivolts. If a higher voltage, as for instance 30 millivolts, is produced a variable resistor will produce a voltage drop of 7.5 millivolts.

The calibration of the calorimeter may be effected for instance in the following manner: a gauging gas is employed whose known heating value amounts for instance to 10,000 kcal./Nm.³. The electric measuring instrument of the converter or computor may be so selected and graduated that a voltage of 22.5 millivolts is required to indicate this heating value. The thermovoltage at the terminals of the thermocolumn in its condition under no load, i.e. without connecting resistor 1 thereto, may amount for instance to 30 millivolts, which means that the measuring instrument will indicate too high a heating value. The variable resistor 1 is now so adjusted that the current flow at the thermoelement and at the resistors outside the terminals 8 and 9 produce a voltage drop of 7.5 millivolts and that between the terminals 8 and 9 the measuring voltage amounts to 22.5 millivolts, or that at the dial graduated in kcal./Nm.³ of the measuring instrument, the known heating value of the gauging gas of 10,000 kcal./Nm.³ is read. If this adjustment is effected, the computor is ready for operation.

The variable resistors of the arrangement according to the invention may also be designed so that the product of a constant factor together with the measured variable magnitude may be set thereon, for instance the value set on the resistor 5 may be proportional to the product $G_D \times c_{pD}$. The voltage measured at the resistor 5 between the sliding contact and the connection to the resistor 7 is proportional to the term in Formula 1

$$K \times G_D \times c_{pD}$$

multipled by $L \times \Delta t$. The multiplication by K is caused by the parallel arrangement of resistors 3 and 5, effected by the resistor value of resistor 3 variable in view of the sliding contact. This, however, would change the total resistance of the parallel arrangement and thereby the total current flow. In order to prevent such change, there is employed a resistor 2 which is variable simultaneously with the resistor 3 and which is so dimensioned that it will compensate for the change in the resistance of the total resistance thereby holding the total resistance always constant. The voltage drop at the fixed resistor 7 is proportional to the term in Formula 1 $L \times \Delta t \times c_{pL}$ in which L and $c_{pL}$ represent constant values.

Inasmuch as the voltage of the thermocouple means will vary substantially directly as the temperature, and the resistance of the circuit connected to the thermocouple remains constant, it follows from the foregoing formula that the value of resistor 7 is proportional to the last term in the formula which represents the specific heat of dry air.

It is, of course, to be understood that the present invention is, by no means, limited to the particular arrangement shown in the drawing but also comprises any modifications within the scope of the appended claims.

What I claim is:

1. In an apparatus for converting heating values pertaining to a combustible gas and ascertained in a calorimeter to a value at a certain novel condition of said gas; said calorimeter having means for creating a voltage in conformity with the heat developed therein and having a pair of terminals: a first resistor representing the specific heat of dry air and having one end connected to one of said terminals, a second resistor in series with said first resistor, a third resistor having one end connected to the other of said terminals, a fourth resistor having one end connected to the junction of said first and second resistors, sliding contact means having contact elements engaging said third and fourth resistors and electrically connected to the end of said second resistor remote from said first resistor, a movable contact on said second resistor, first condition sensitive means operable to measure the barometric pressure and the temperature of the combustible gas to be investigated and operatively connected with said sliding contact means for adjusting the same in conformity with the measured pressure and temperature, movement of said sliding contact means causing one contact element to move on its pertaining resistor toward the said one end thereof while the other contact element moves on its pertaining resistor away from the said one end thereof, second condition sensitive means responsive to temperature changes only of said gas to be investigated and operatively connected to said movable contact for adjusting the same in conformity with the temperature of the said gas, and means for connecting a voltage sensitive measuring means between said movable contact and the end of said first resistor remote from said second resistor.

2. An apparatus according to claim 1, which also includes a fixed additional resistor in the connection leading from said fourth resistor to the junction of said first and second resistors.

3. An apparatus according to claim 1, which includes an adjustable calibrating resistor connected across the terminals of said calorimeter.

4. An apparatus according to claim 1, which includes an arm connected to each of said sliding contact means and said movable contact and movable by the pertaining condition sensitive means for adjusting said sliding contact means and said movable contact, and a scale adjacent each of said arms for indicating the respective positions thereof.

5. An apparatus according to claim 1, in which the respective changes in resistance of said third and fourth resistors as said sliding contact means moves thereon is such that the resistance of the apparatus from said one terminal of the calorimeter to the junction point of said first and second resistors is always the same.

References Cited in the file of this patent
UNITED STATES PATENTS 2,689,477  Hornfeck _____ Sept. 21, 1954

FOREIGN PATENTS 459,743  Germany _____ May 14, 1928
640,894  Germany _____ Jan. 14, 1937